Aug. 11, 1959
W. H. DEXTER
2,898,680
DUPLICATING DEVICE
Filed July 26, 1954
3 Sheets-Sheet 3
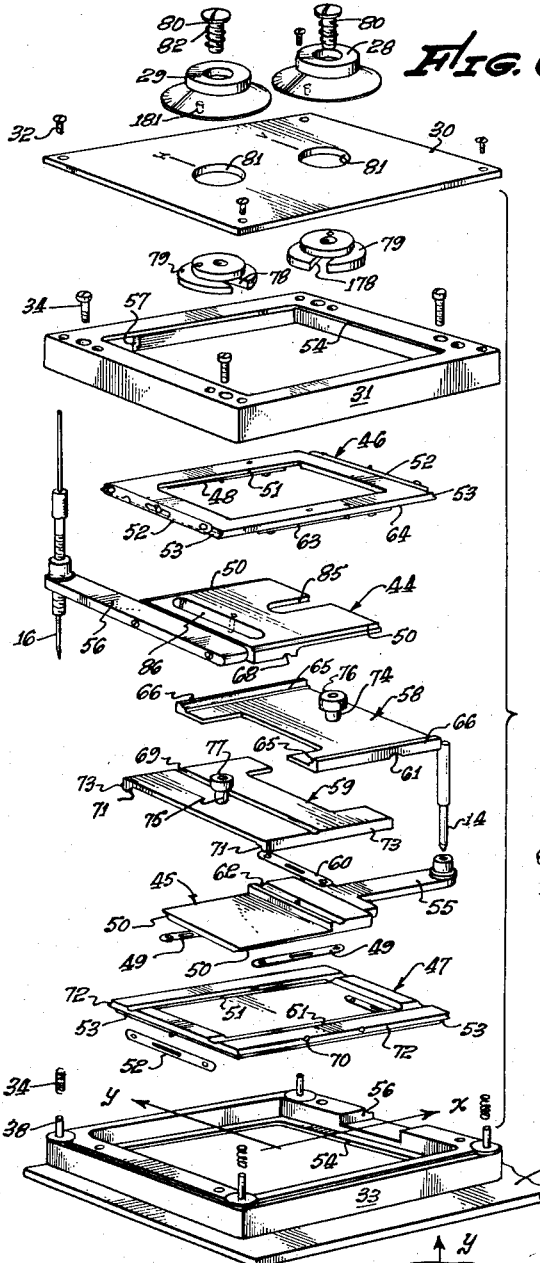
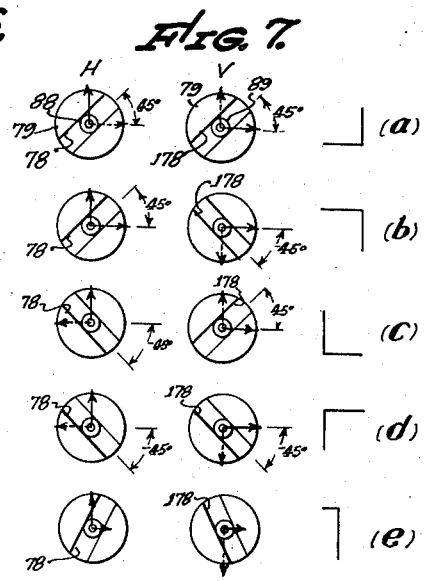
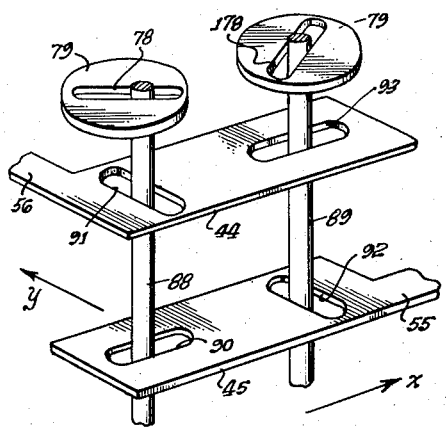
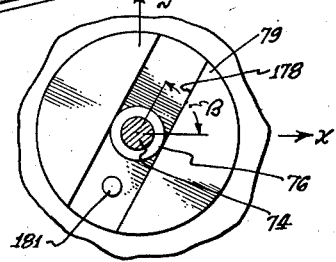
WILBUR H. DEXTER,
INVENTOR.
ATTORNEY.

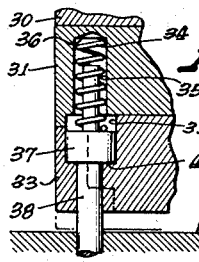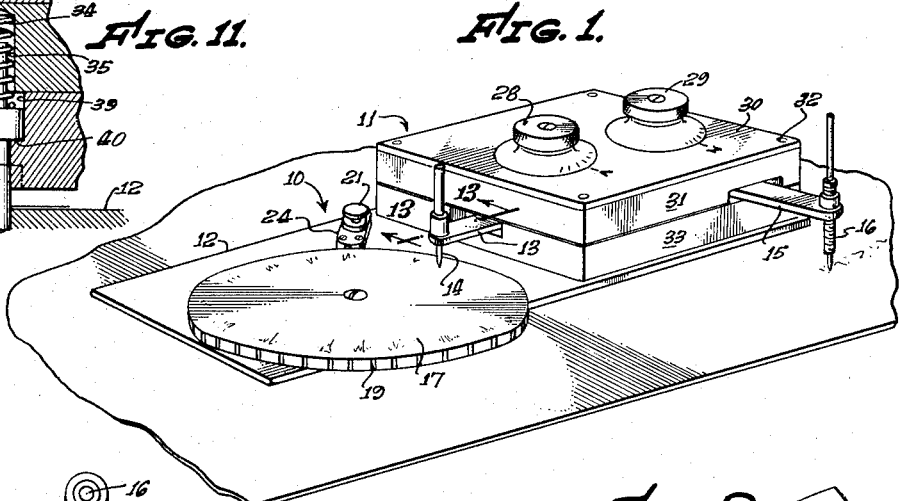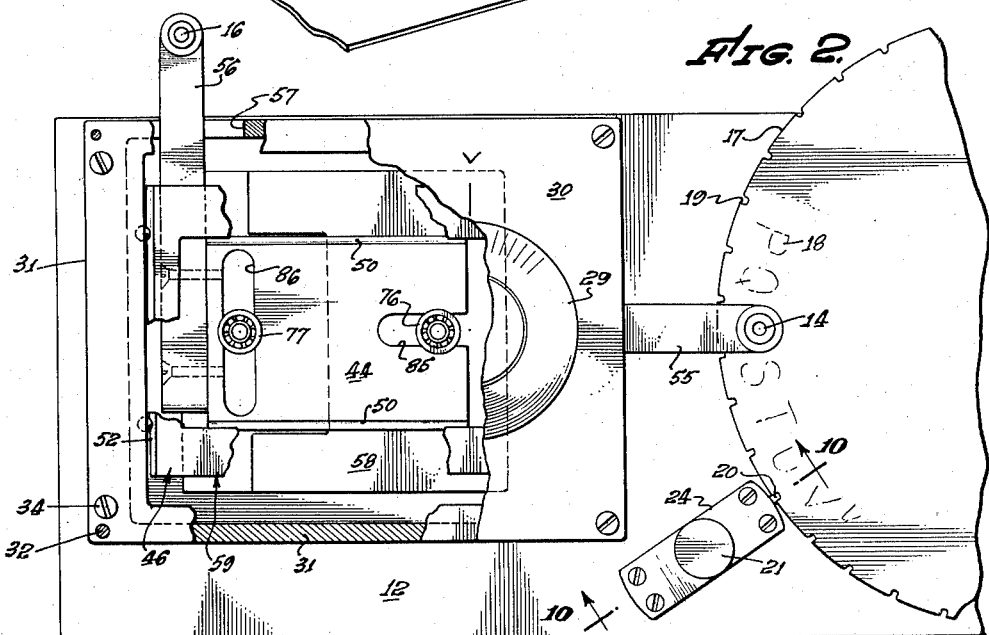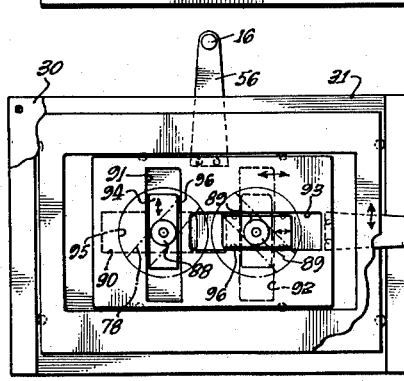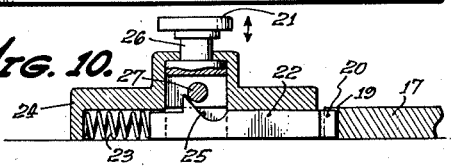
WILBUR H. DEXTER,
INVENTOR.
ATTORNEY.

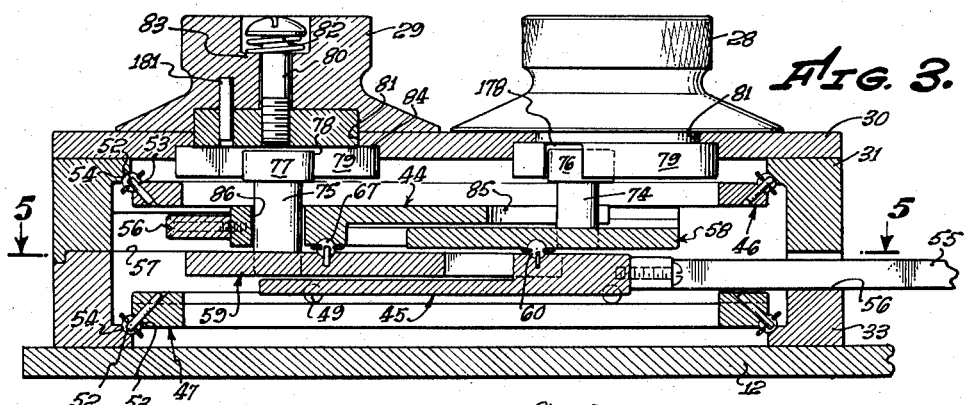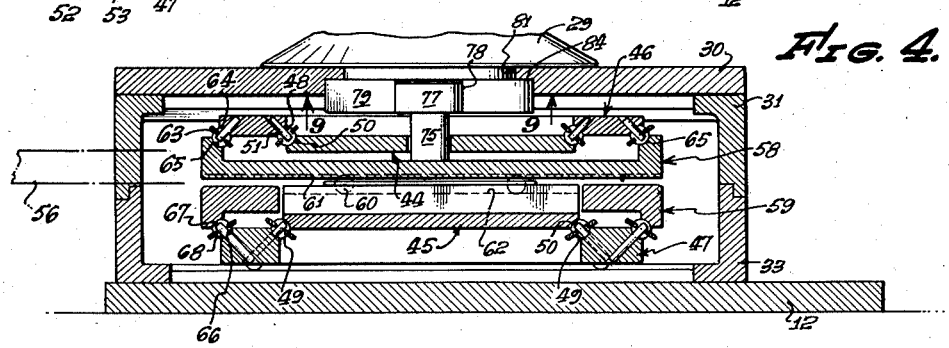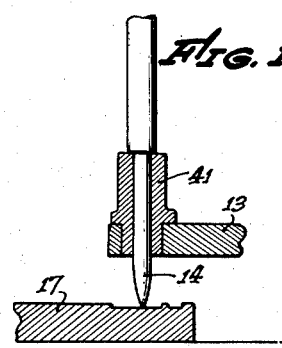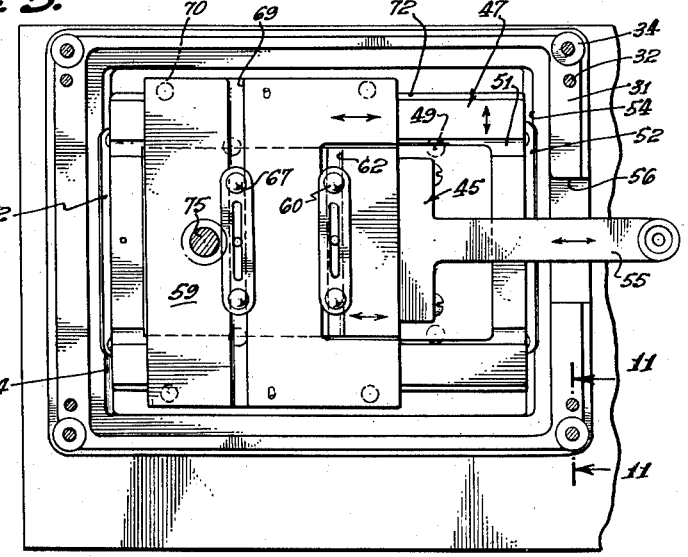

United States Patent Office
2,898,680
Patented Aug. 11, 1959

2,898,680

DUPLICATING DEVICE

Wilbur H. Dexter, Inglewood, Calif.

Application July 26, 1954, Serial No. 445,721

11 Claims. (Cl. 33—23)

This invention relates to motion reproducing devices and more particularly concerns a novel mechanism for adjustably translating motion of an input member to an output member in such a way that movement of the latter member may be caused to vary both directionally and quantitatively with respect to movement of the input member.

Conventional motion reproducing devices, such as pantographs, are so constructed as to cause a motion output member to essentially duplicate the movement of an input member in a particular plane either with or without enlarging or diminishing the amount of output motion with respect to the input motion. These devices are most commonly used in drafting, as for example in laying out symbols and letters in pencil or ink, as reproduced from master letters. In practice the use of such machines is somewhat restricted as a result of their tendency to distort to a certain extent the shapes of reproduced symbols under certain conditions, as by giving the reproduced symbol a slanted or inclined configuration. Furthermore, ordinary lettering instruments are not sufficiently versatile to conveniently reproduce letters and numerals in inverted, sideward, or backward orientation in variable horizontal and vertical sizes without reorienting the instrument or the master letters, and as a result, draftsmen are required to spend considerable extra time in selecting appropriate size master letters and numerals and in orienting them in desired fashion.

The present invention has for its primary purpose the provisions of a motion reproducing device permitting exact and convenient adjustability of the size and orientation of output motions desired from given input motions, as used for example in the production of various size symbols in selected orientation. In accordance with the invention, adjustable means are provided for independently securing, without distortion, quantitative changes in an output motion in either or both of two dimensions and for securing directional changes in such motion in combination with the quantitative changes.

The novel device essentially comprises a pair of plates, each being constrained to move independently and universally in a plane, motion input and output members connected respectively to the two plates, and a pair of followers interconnecting the plates to secure desired quantitative and directional movement of the output member in a plane in response to a given movement of the input member. The followers are connected to the plates in such a way as to cause the output member to move desired distances in perpendicular dimensions of a rectangular coordinate system upon movement of the input member.

The particular device contemplated is so constructed as to constrain the output member to move, for example, a desired positive or negative distance in the y-dimension of a rectangular co-ordinate system upon a given amount of movement of the input member in the x-dimension; and similarly, the device is independently controllable and adjustable to cause the output member to move a desired positive or negative distance in the x-dimension as a result of a given movement of the input member in the y-dimension. A pair of angularly adjustable linear cams and cam engaging followers operatively control movement of the plate connected to the output member to secure both quantitatively and directionally variable movement of the output member, in order to obtain the desired amount and orientation of output motion produced.

It is contemplated that the present invention may be used for obtaining a time record of changes in two independent variables, such as temperature and pressure. For this purpose, the input member may be given a steady motion, having both $x$ and $y$ components, at a rate corresponding to a given time interval, so as to produce a similar motion of the output member to which a pen is attached for the recordation of the motion on paper. The two independently adjustable linear cams may be operatively connected to devices sensing changes in temperature and pressure so as to change the setting of the cams upon temperature and pressure variations. As a result, the line drawn by the pen will not correspond in configuration with the movement of the input member but will vary according to the amplification or attenuation of the $x$ and $y$ components of the output motions as controlled by the adjustable cams.

These and other objects and advantages of the invention will be understood from the following description of certain preferred forms illustrated by the accompanying drawings, in which:

Fig. 1 is a general oblique view showing the external form of the motion reproducing device;

Fig. 2 is an enlarged plan view of the device, fragmentary in part;

Fig. 3 is an enlarged sectional view of the motion translating mechanism taken in elevation;

Fig. 4 is an elevational view of the mechanism taken at right angles to Fig. 3;

Fig. 5 is a view taken on line 5—5 of Fig. 3;

Fig. 6 is an exploded view of the motion translating mechanism showing each of the parts in detail;

Fig. 7 is a schematic representation of the various output motions derivable from various input motions;

Fig. 8 is an oblique view of a simplified motion translating device;

Fig. 9 is a view taken on line 9—9 of Fig. 4;

Fig. 10 is an enlarged sectional view taken on line 10—10 of Fig. 2;

Fig. 11 is an enlarged sectional view taken on line 11—11 of Fig. 5;

Fig. 12 is an enlarged view of a bearing utilized in the mechanism;

Fig. 13 is an enlarged view taken on line 13—13 of Fig. 1; and

Fig. 14 is a plan view fragmentary in part showing a modified form of motion translating device embodying the invention.

The motion reproducing device 10 shown in Figs. 1 and 2 comprises generally a motion translating mechanism 11 mounted upon a base 12 and having a motion input member 13 carrying a stylus 14 and an output member 15 carrying a marking pen 16. Also mounted on the base is a rotatable circular disc 17 on which letters of the alphabet 18 are inscribed in such a position as to be engageable by the stylus 14. The disc has a plurality of circumferentially spaced notches 19 formed on its edge to be engaged, as desired, by a detent 20 controlled by button 21.

The detent mechanism is shown in detail in Fig. 10 and comprises a slider 22 urged toward disk 17 by spring 23 carried by housing 24, the slider having a cammed shoulder 25 formed in its upper surface. A push button 21 is mounted on a rod 26 extending downward into the housing and carrying a circular projection 27 at its lower extremity. When the button 21 is pushed downward, it causes the slider to compress spring 23 and the detent 20 to disengage the notches 19 to free the disk 17, so that it may be rotated. In this way any particular numeral or letter 18 may be brought under the stylus 14 to be traced, and release of the button 21 will cause the disk to be held in selected position by engagement of the detent with a notch.

Referring again to Fig. 1, it will be seen that a pair of calibrated adjusting knobs 28 and 29 are mounted on the top surface of the motion translating mechanism 11. As will be described later, these knobs may be independently rotated to adjust and control the motion of the output member 15 and pen 16 in relation to movement of the stylus 14 so as to obtain desired orientation and size of reproduced symbols.

The motion translating device 11 includes a housing having a top 30 joined to an upper frame 31 by hold-down screws 32, and a lower frame member 33 joined to the upper frame member by screws 34. These housing elements are normally spaced above base 12 as shown in Fig. 11 by a spring 34 seated within a bore 35 in frame 31 and compressed between the upper end 36 of the bore and a flange 37 formed on a rod 38 extending upward from the base and through the frame members 31 and 33 at their corners. The flange 37 is positioned within an enlarged bore 39 in frame member 33 and normally seats against the lower end 40 of the bore to limit the upward spacing of the housing above the base. When the housing is forced downward to bring the stylus into engagement with one of the symbols or letters inscribed in the disk 17 for tracing purposes, the spring 34 is compressed until the under surface of frame member 33 engages the base 12.

As shown in Fig. 13 the stylus 14 is supported in vertical position within a bushing 41 carried in the end of input member 13. The lower end of the stylus is pointed to engage the depressions or indentations 42 formed by the symbols in the disk 17 for accurate movement therein.

The detailed mechanism of the motion translating device is shown in Figs. 2 through 6 to comprise a series of plates mounted in sandwiched relation and movable with respect to one another on linear bearings interposed between the plates in right angular relation. Each of the linear bearings comprises an elongated retainer 141 carrying two or more balls 142 and having a slot 143 formed intermediate the balls, as illustrated in Fig. 12. A pin 144, passing through the slot and normally joined to one of the plates, limits linear travel of the bearing. Universally movable plates 44 and 45 are mounted on plates 46 and 47 and constrained to move in a first or x-direction by bearings 48 and 49. These bearings run in linear bearing races 50 formed at opposite edges of the plates 44 and 45 and corresponding races 51 formed in open faced plates 46 and 47.

The latter two plates are respectively mounted in frame members 31 and 33 for movement in a second or y-direction. Movement of these plates in the second direction is facilitated by bearings 52 interposed between races 53 formed in a pair of opposite edges of the plates 46 and 47, and races 54 formed in similar edges of the frame members 31 and 33, the races and bearings extending in the second direction. It is therefore evident that plates 44 and 45 are separately and independently universally moveable in parallel planes by virtue of their ability to move in the first direction with respect to plates 46 and 47, and to move in the second direction by virtue of moveability of plates 46 and 47 in the second direction. The first and second directions are, of course, perpendicular or right angular in orientation.

Movement of the stylus 14 is communicated to plate 45 through the input arm 55 connected to the plate and extending in the first direction through opening 56 in frame member 33. Similarly, movement is communicated from plate 44 to reproducing pen 16 by output arm 56 connected to the plate and extending through opening 57 in frame member 31. In order to controllably translate motion from plate 45 to plate 44 in desired manner, a follower mechanism is provided, as will now be described. The particular mechanism shown, includes a pair of plates 58 and 59 sandwiched between plates 44 and 45, plate 58 being connected to and spaced from plate 45 by means of a linear bearing 60 running in opposite races 61 and 62 formed in the two plates. The bearings and races extend in the second direction so that when plate 45 is moved in the second direction no motion is communicated to plate 58, but when plate 45 is moved in the first direction, plate 58 will be carried in that direction. Plate 58 is also connected to and spaced from plate 46 by means of linear bearings 63 running in races 64 and 65 formed respectively in plates 46 and 58. Races 65 are formed at opposite sides of the plate 58 in raised edge portions 66 thereof. Since these bearings and races extend in the first direction, movement of plates 45 and 58 in the first direction will not be communicated to plates 46 and 44.

Plate 59 of the follower mechanism is connected to plate 44 by means of a linear bearing 67 shown in Figs. 3 and 5 running in races 68 and 69 formed in these plates. The bearings and races extend in the second direction, so that when plate 59 is moved in that direction no motion is communicated to plate 44; however, when plate 59 moves in the first direction, plate 44 will be carried in that direction by the bearing 67. Plate 59 is in turn mounted on plate 47 by means of bearings 70 and races 71 and 72 formed in the plates. The races 71 are formed in downwardly projecting side portions 73 of plate 59, while corresponding races 72 are formed at the edges of plate 47. Since the bearings and races extend in the first direction, movement of plate 45 in the first direction will not be communicated to plates 47 and 59, but motion will be communicated to these plates on movement of plate 45 in the second direction. Summarizing briefly, movement of input member 55 in the first direction will effect movement of follower plate 58 in that direction but will not effect any movement of plates 44 and 59 in the first direction. Similarly, movement of input member 55 in the second direction will effect movement of follower plate 59 in the second direction but will not effect movement of plates 44 and 58 in that direction.

The follower mechanism also includes posts 74 and 75 formed respectively on plates 58 and 59 and extending upward through the rectangular opening in plate 46, the posts having anti-friction bearings 76 and 77, mounted on their upper ends. As shown in Figs. 3 and 4, these bearings fit within linear cam slots 78 and 178 formed in discs 79, which are attached to the under sides of the knobs 28 and 29, as by screws 80. The discs are rotatably mounted within bores 81 formed in the top 30 and communicate with the interior of the housing. Pins 181 connecting each knob with its disc are provided in order to prevent relative rotation therebetween. A compression spring 82 is inserted between the head of each screw and an internal shoulder 83 of the knob in order to urge the disc into engagement with an internal shoulder 84 associated with bore 81, to provide a certain degree of frictional resistance to rotation of the knob. It is evident that such rotation will vary the orientation of the cam slot 78 with respect to the first and second directions. A pair of perpendicular slots or ways 85 and 86 formed in driver plate 44 are provided to accommodate posts 74 and 75 respectively, slot 85 extending in the first direction and slot 86 extending in the second direction. Likewise, the races 50 and 62 in driving plate 45 comprise mutually perpendicular ways respectively parallel to ways 85 and 86 in driver plate 44.

Assuming that the cam slots 78 are each oriented in a direction extending at an angle to the first and second directions, movement of input member 55 in the first direction will bring about movement of post 74 in the first direction independently of post 75; however, at the same time such movement is accomplished post 74 and plate 58 are moved in the second direction by engagement of bearing 76 with a side wall of cam slot 178, as is better illustrated in Fig. 9. As a result, plates 46 and 44 are carried in the second direction by an amount governed by the particular angle of the cam slot 78. Assuming that the angle between the cam slot and the first direction is the angle $\beta$, the mathematical expression for movement of the output member 56 and pen 16 in the second direction for a given input motion of the input member 55 and stylus 14 in the first direction may be represented as:

$$y = x_1 \tan \beta$$

in which $y$ represents output movement in the second direction, and $x_1$ represents input movement in the first direction.

In a similar manner, movement of the input member 55 in the second direction, accomplishes movement of post 75 in that direction; however, such movement is accompanied by first direction movement of the post, plate 59, and plate 44 as a result of engagement of bearing 76 with the sides of cam slot 78 joined to knob 29. Assuming that the angle between this cam slot and the first direction is an angle $\alpha$, the mathematical expression for the first direction movement of the output member 56 and the pen 16 may be represented as:

$$x = y_1 \cot \alpha$$

where $x$ equals the distance moved by the pen 16 and output member 56, and $y_1$ equals the distance moved by the input member in the second direction.

A simplified embodiment of the essential structure is shown in Fig. 8 to include plates 44 and 45 and input and output arms 55 and 56, in which the numerals correspond to those in Fig. 6. The follower mechanism is represented by a pair of vertical posts or cylinders 88 and 89 passing through perpendicular slots 90 and 91, and 92 and 93 formed in the two plates 44 and 45 respectively, the edges of these slots being ways, and the plates 44 and 45 being coupled through the follower posts and ways. The two slots 90 and 93 extend in the first direction, while slots 91 and 92 extend in the second direction. The upper ends of the posts engage cam slots 78 formed in discs 79, which may be independently rotated to vary the angular orientation of the slots. Assuming that the two posts remain vertically disposed at all times but are laterally movable, a first direction movement of plate 45 will carry post 89 in that direction but will not displace post 88. On the other hand a second direction movement of plate 45 will move post 88 in that direction but will not displace post 89. If the cam slots 78 and 178 are angularly disposed with respect to the first and second directions, the upper end of post 89 will be moved in the second direction by the wall of cam slot 178 upon first direction movement of that post, so as to displace the plate 44 in the second direction as governed by the angularity of the slot. Similarly, second direction movement of post 88 effects first direction movement of plate 44 depending upon the angularity of the cam slot 78 engaging the upper end of the post. These relationships are governed by the equations set out above.

Various movements communicated to the output member 56 resulting from a given movement of the input member 55, as regulated by the cam slots 78 and 178 are illustrated in Fig. 7 in which the solid line arrow designates input movement and the dashed line arrow represents output movement. For convenience, sections through the discs 79 are shown in order to illustrate movement of the followers or posts 88 and 89 in the cam slots 78 and 178 as the posts are moved. In view (a) of Fig. 7, a 45° angularity of both cam slots 78 and 178 will bring about the generation of a right angular figure with its corner in the lower right hand position, upon movement of the input member, as shown by the dotted lines. In view (b) cam slot 178 extends at −45°, and the right angular figure has its corner in the upper right position. As shown in view (c) with slot 78 at −45° and slot 178 at 45°, the right angle figure is disposed in L position, while in view (d) the corner of the figure is in the upper left position, as a result of both slots extending at −45°. When the angularity of the cams 78 and 178 is changed from 45°, the length of the horizontal and vertical legs of the right angled figures are increased or decreased, as is seen in view (e) of Fig. 7. It will be evident from these views that a typical generated figure may be oriented in upright or inverted positions, either forward or backward, in the common sense, so that four different right angular orientations are possible. Adjustment of the knobs 28 and 29 also regulates the height and width of the symbols reproduced, in combination with the various orientations described above, lending extended utility and versatility to the device.

A modification of the follower mechanism is illustrated in Fig. 14 in which perpendicular slots are formed in superimposed plates 44 and 45, and numbered the same as in Fig. 8. As shown in the plan view represented, each of the posts or uprights 88 and 89 is connected to a pair of perpendicular slideable elements each of which is connected in one of the slots shown, to move unidirectionally therein. Post 88 is joined to elements 94 and 95 mounted for slideable movement in slots 91 and 90 respectively by means of linear bearings 96 as shown, and a similar construction is associated with post 89. The perpendicular elements 94 and 95 serve to maintain the post 88 in upright position for desired engagement with the cam slot 78. The operation of the mechanism shown in Fig. 14 is similar to that described in connection with Fig. 8.

I claim:

1. A motion reproducing device, comprising input and output members universally movable in parallel planes, each of said members having ways extending in mutually perpendicular linear directions parallel to said planes with ways in each member being parallel to ways in the other member, first and second follower means for transmitting motion from the input member to the output member, said members being coupled through said follower means and ways, said first follower means being movable with the input member in one of said perpendicular directions and with the output member in the other of said directions perpendicular to said one direction, said first follower means and input member being relatively movable along a way extending in the other of said directions and said first follower means and output member being relatively movable along a way extending in said one direction, said second follower means being movable with said input member in the other of said perpendicular directions and with the output member in said one perpendicular direction, said second follower means and input member being relatively movable along a way extending in said one direction and said second follower means and output member being relatively movable along a way extending in said other direction, and guide means constraining said first follower means to move said output member in said other perpendicular direction in response to first follower means movement with said input member in said one direction and constraining said second follower means to move said output member in said one direction in response to second follower means movement with said input member in said other direction.

2. The invention as defined in claim 1 in which said guide means are adjustable to increase and decrease the motion transmitted to said output member by each of said first and second follower means.

3. A motion reproducing device comprising input and output plate members universally movable in parallel planes, each of said members having ways extending in mutually perpendicular linear directions parallel to said planes with ways in each member being parallel to ways in the other member, first and second follower means for transmitting motion from the input member to the output member, said first follower means being movable with the input member in one of said perpendicular directions and with the output member in the other of said directions perpendicular to said one direction, said first follower means and input member being relatively movable along a way extending in the other of said directions and said first follower means and output member being relatively movable along a way extending in said one direction, said second follower means being movable with said input member in the other of said perpendicular directions and with the output member in said one perpendicular direction, said second follower means and input member being relatively movable along a way extending in said one direction and said second follower means and output member being relatively movable along a way extending in said one direction, first angularly adjustable cam means constraining said first follower means to move said output member in said other perpendicular direction in response to first follower means movement with said input member in said one direction, and second angularly adjustable cam means constraining said second follower means to move said output member in said one direction in response to second follower means movement with said input member in said other direction.

4. The invention as defined in claim 3 including third and fourth plates respectively mounting said input and output plates for movement in one of said directions, and means mounting said third and fourth plates for movement in the other of said directions.

5. The invention as defined in claim 4 in which said first and second follower means include other plates interposed between said input and output plate members in parallel layered relation.

6. The invention as defined in claim 5 including ball bearings mounting all of said plates for parallel movement.

7. The invention as defined in claim 3 in which said input and output plate members contain elongated slots defining said ways and receiving said follower means.

8. The invention as defined in claim 3 including a tracing stylus carried by said input plate member and a work stylus carried by said output plate member.

9. The invention as defined in claim 8 including a housing surrounding said plate members and follower means, a pair of rotatable knobs outside said housing for adjusting said first and second cam means respectively, and in which said tracing and marking styli extend outside said housing.

10. The invention as defined in claim 3 in which movement of the output member is represented by the expressions:

$$x = y_1 u$$
$$y = x_1 v$$

in which $x$ and $y$ respectively represent distances moved by said output member in said mutually perpendicular linear directions, $x_1$ and $y_1$ respectively represent distances moved by said input member in said directions, and $u$ and $v$ represent separately variable scale factors controlled by adjustment of said first and second cam means.

11. The invention as defined in claim 3 in which movement of said output member is represented by the expressions $$x = y_1 \cot \alpha$$
$$y = x_1 \tan \beta$$

in which $x$ and $y$ respectively represent distances moved by said output member in said mutually perpendicular linear directions, $x_1$ and $y_1$ respectively represent distances moved by said input member in said directions, and $\alpha$ and $\beta$ respectively represent angles formed between the first and second cam means and one of said directions.

References Cited in the file of this patent

UNITED STATES PATENTS

| Number | Name | Date |
|---|---|---|
| 2,432,161 | Johnston | Dec. 9, 1947 |
| 2,475,326 | Johnson | July 5, 1949 |
| 2,512,918 | Chamberlain | June 27, 1950 |
| 2,569,188 | Pecher | Sept. 25, 1951 |
| 2,671,965 | Pollitt | Mar. 16, 1954 |
| 2,714,254 | Andrews et al. | Aug. 2, 1955 |

FOREIGN PATENTS

| Number | Country | Date |
|---|---|---|
| 791,503 | France | Sept. 30, 1935 |
| 452,740 | Great Britain | Aug. 28, 1936 |